(No Model.)
J. W. FREE & J. F. BALDWIN.
DRYING APPARATUS.
No. 316,353. Patented Apr. 21, 1885.
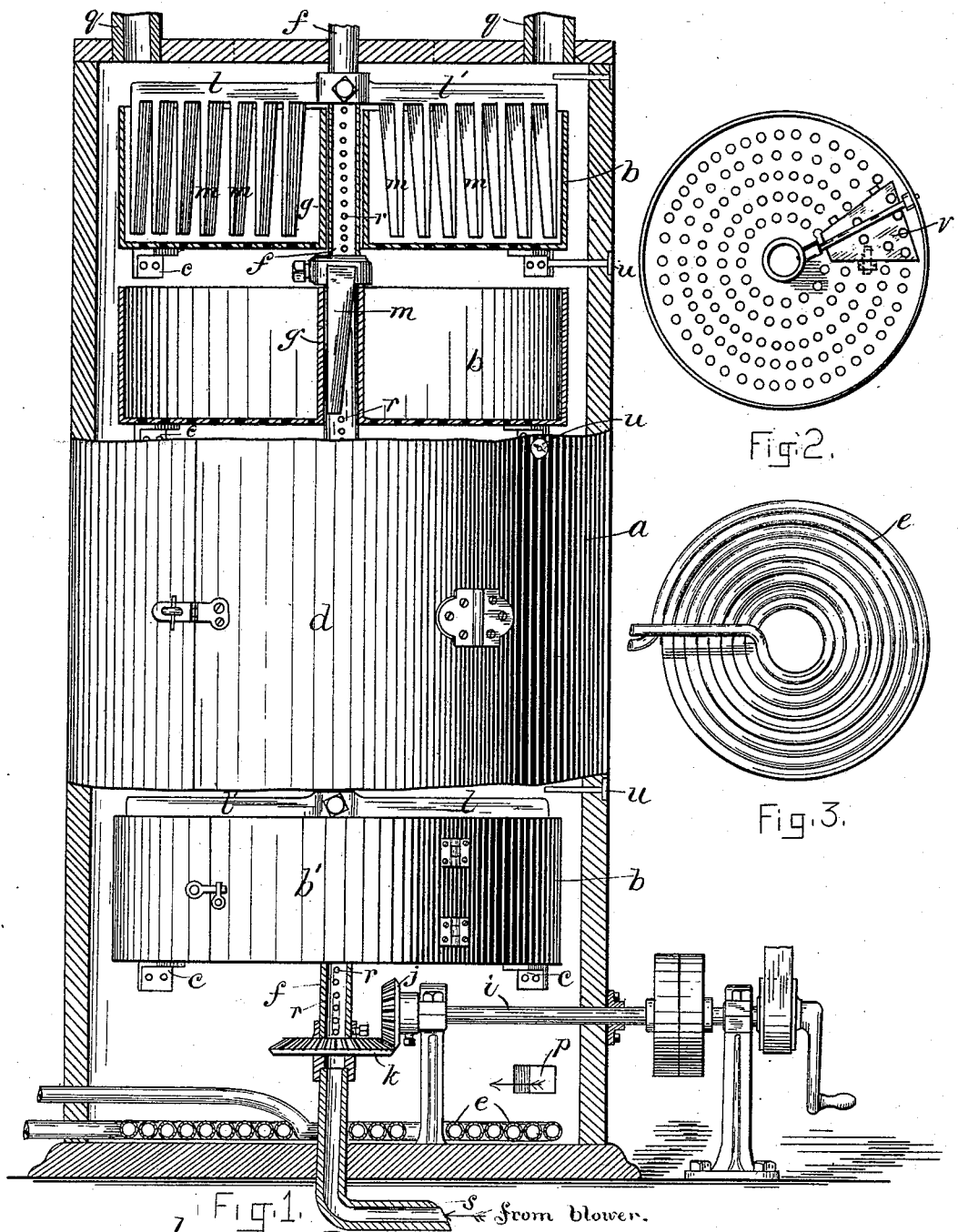
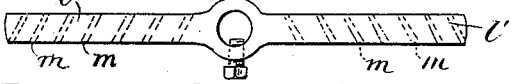
WITNESSES:
Chas. S. Gooding
H. Brown
INVENTORS
J. W. Free
J. F. Baldwin

UNITED STATES PATENT OFFICE.

JOHN W. FREE, OF CHICAGO, ILLINOIS, AND JOSEPH F. BALDWIN, OF CAMBRIDGE, MASSACHUSETTS; SAID BALDWIN ASSIGNOR TO SAID FREE.

DRYING APPARATUS.

SPECIFICATION forming part of Letters Patent No. 316,353, dated April 21, 1885.

Application filed September 6, 1884. (No model.)

*To all whom it may concern:*

Be it known that we, JOHN W. FREE, of Chicago, in the county of Cook and State of Illinois, and JOSEPH F. BALDWIN, of Cambridge, in the county of Middlesex and State of Massachusetts, have invented certain Improvements in Apparatus for Malting and for Drying Fruits and Cereals, of which the following is a specification.

This invention has for its object to provide improved apparatus whereby the process of malting may be effectually and economically carried on and adapted to serve as a drier for malt, cereals, fruits, &c.

The invention consists in the improved apparatus as a whole and in the several details thereof, hereinafter described and claimed.

Of the accompanying drawings, forming a part of this specification, Figure 1 represents a side elevation and partial section of an apparatus embodying our invention. Fig. 2 represents a plan view of one of the pans or receptacles. Fig. 3 represents a plan view of the steam-coil shown in section in Fig. 1. Fig. 4 represents an edge view of one of the stirrers.

The same letters of reference indicate the same parts in all the figures.

In carrying out our invention we construct a casing, $a$, and in it place a series of pans or receptacles, $b\ b$, having substantially horizontal bottoms and so arranged that air can pass from the bottom to the top of the casing around and over the several pans. In the construction shown in Fig. 1, the casing and pans are circular in horizontal section and have perforated bottoms. Each pan is separated from the casing by an annular space, the pans being firmly secured to the casing by suitable brackets, $c\ c$. The casing has one or more doors, $d$, whereby access may be had to the pans $b$, the latter being also provided with doors $b'$ for the insertion and removal of the malt.

$e$ represents a steam-coil, placed at the bottom of the casing for the purpose of heating air to be used in drying the grain or other material in the pans, the hot air passing upwardly through the perforated bottoms of the pans and around the sides and over the upper edges thereof.

$f$ represents a vertical shaft extending through the center of each pan, the pans being provided with fixed sleeves $g$, in which said shaft rotates. The shaft $f$ is rotated by a driving-shaft, $i$, rotated by power and having a bevel-gear, $j$, meshing with a bevel-gear, $k$, on the shaft $f$. To the shaft $f$ are affixed a series of stirrers, one for each pan. Each stirrer is composed of two horizontal arms, $l\ l'$, secured to and projecting in opposite directions from the shaft $f$, and a series of vertical blades or fingers, $m$, projecting downwardly from said arms. The blades $m$ are set obliquely on the arms, and those on one arm of each stirrer are arranged at an opposite angle from those on the other arm, as shown in dotted lines in Fig. 4, the arrangement being such that when the stirrers are rotated the blades on the one arm of each stirrer will move the grain in the corresponding pan from the center of the pan outwardly, while the blades of the other arm will move the grain from the outer portion of the pan inwardly toward the center. A uniform agitation of the grain is thus effected, and all portions thereof are subjected to the action of the hot air passing through the casing.

$p$ represents an opening in the casing above the steam-coil for the admission of the air to be heated, said opening being controlled by a slide or damper, and $q\ q$ represent flues or pipes for the escape of the air, vapors, &c., from the upper part of the casing. Said pipes should have dampers, whereby they may be wholly or partially closed to control the escape of hot air.

The shaft $f$ may be tubular and provided with perforations $r$, as shown in Fig. 1, so that it can conduct hot air supplied by a blower through a pipe, $s$, communicating with the lower end of the tubular shaft, said hot air being discharged through the perforations into and between the pans $b$.

One or more thermometers, $u$, may be inserted in the casing $a$, so as to indicate at the exterior of the casing the internal temperature.

The described apparatus may be used both for germinating and drying malt, the dry grain being first placed in the pans and then moistened and allowed to swell and germinate, the air in the casing being kept at a normal temperature by shutting off the steam from the coil while the moist grain is germinating. During the germinating process the stirrers may remain motionless or may be set in motion from time to time. When the germinating process is completed, heat is applied and the stirrers are set in motion. The grain is thus agitated and dried uniformly and rapidly, the peculiar arrangement of the blades of the stirrers above described preventing any portion of the grain from lodging or remaining quiet.

It will be seen that the handling or transportation of the grain between the germinating and drying operations is wholly avoided.

This apparatus may be used not only for germinating and drying malt, but for drying cereals, fruits, &c., the stirrers being omitted when the apparatus is used for drying articles liable to be bruised or injured thereby.

Each pan may have a pivoted trap-door, $v$, in its bottom, whereby the grain may be discharged from the pan to the one below, if desired.

The preferable method of supplying and emptying the pans is through the doors $b'$ thereof, a suitable chute or spout being employed to conduct the grain from each pan.

We claim—

1. The improved malt-machine and drying apparatus composed of the casing having a door or doors, $d$, the vertical series of fixed pans arranged in the casing and separated therefrom by annular spaces which permit an upward passage of air around and over the pans, as described, and provided with doors $b'$, coinciding with the doors $d$ of the case, and means, substantially as described, whereby hot air is supplied to the casing, as set forth.

2. The stirrers composed of the arms projecting from the operating-shaft and the two series of wings or blades oppositely inclined to move the grain in different directions, as set forth.

In testimony whereof we have signed our names to this specification, in the presence of two subscribing witnesses, this 2d day of September, 1884.

JOHN W. FREE.
JOSEPH F. BALDWIN.

Witnesses:
C. F. BROWN,
A. L. WHITE.